United States Patent
Morita et al.

(10) Patent No.: US 11,002,311 B2
(45) Date of Patent: May 11, 2021

(54) VEHICLE WEIGHT MEASUREMENT DEVICE

(71) Applicant: NSK LTD., Tokyo (JP)

(72) Inventors: Ryuho Morita, Fujisawa (JP);
Yasuyuki Matsuda, Fujisawa (JP);
Masafumi Hikida, Fujisawa (JP);
Eisaku Suzuki, Fujisawa (JP);
Shunsuke Suzuki, Fujisawa (JP);
Yoshiya Mukai, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/623,193

(22) PCT Filed: Dec. 15, 2017

(86) PCT No.: PCT/JP2017/045094
§ 371 (c)(1),
(2) Date: Dec. 16, 2019

(87) PCT Pub. No.: WO2018/230015
PCT Pub. Date: Dec. 20, 2018

(65) Prior Publication Data
US 2020/0378438 A1    Dec. 3, 2020

(30) Foreign Application Priority Data
Jun. 16, 2017    (JP) .............................. JP2017-118514

(51) Int. Cl.
*B60G 15/06*        (2006.01)
*F16C 19/46*        (2006.01)
(Continued)

(52) U.S. Cl.
CPC ............ *F16C 19/46* (2013.01); *B60G 15/068* (2013.01); *B60G 2204/11* (2013.01);
(Continued)

(58) Field of Classification Search
CPC .............. B60G 15/968; B60G 2204/11; B60G 2400/51; B60G 2400/60; G01G 19/10; F16F 9/32; F16C 19/46
See application file for complete search history.

(56) References Cited

U.S. PATENT DOCUMENTS 5,060,525 A    10/1991    Häfner
5,979,218 A    11/1999    Biddle et al.
(Continued)

FOREIGN PATENT DOCUMENTS

CN    204535832 U        8/2015
EP        0392071 A1 *   10/1990    ........... B60G 15/068
(Continued)

OTHER PUBLICATIONS

International Search Report (PCT/ISA/210) dated Feb. 27, 2018 by the International Search Authority in counterpart International Patent Application No. PCT/JP2017/045094.
(Continued)

*Primary Examiner* — Ruth Ilan
(74) *Attorney, Agent, or Firm* — Sughrue Mion, PLLC

(57) ABSTRACT

A vehicle weight measurement device includes a diaphragm which covers an opening area of a groove portion of a mounting part to form an oil chamber of a predetermined space together with the groove portion; a pressure sensor which detects a change in pressure of measurement fluid in the oil chamber; a first piston which presses the diaphragm; a second piston which presses the first piston; and a bearing unit interposed between the second piston and a spring bush which receives one end of a spring of a suspension device and is relatively rotatable. The bearing unit includes a thrust needle bearing which swingably supports a load in a longitudinal direction of the suspension device, and a slide bush which does not receive a load in the longitudinal direction
(Continued)

and receives a load in a radial direction while causing constant damping to swinging.

8 Claims, 9 Drawing Sheets

(51) Int. Cl.
*G01G 19/10* (2006.01)
*F16F 9/32* (2006.01)

(52) U.S. Cl.
CPC .... *B60G 2204/418* (2013.01); *B60G 2400/51* (2013.01); *B60G 2400/60* (2013.01); *F16F 9/32* (2013.01); *G01G 19/10* (2013.01)

(56) References Cited

U.S. PATENT DOCUMENTS

| | | | |
|---|---|---|---|
| 2006/0148642 | A1 | 7/2006 | Ryu et al. |
| 2017/0130768 | A1 | 5/2017 | Matsuda et al. |
| 2017/0227057 | A1 | 8/2017 | Hamrodi et al. |
| 2019/0226906 | A1* | 7/2019 | Yamamoto ........... B60G 17/019 |
| 2019/0285461 | A1* | 9/2019 | Hikida ....................... G01L 1/02 |
| 2020/0173837 | A1* | 6/2020 | Hikida ................. G01G 19/028 |

FOREIGN PATENT DOCUMENTS

| | | | | | |
|---|---|---|---|---|---|
| EP | | 3 045 374 | A1 | | 7/2016 |
| EP | | 3 236 219 | A1 | | 10/2017 |
| FR | | 2513334 | A1 | * 3/1983 | ........... B60G 15/068 |
| GB | | 472793 | A | | 9/1937 |
| GB | | 1296311 | A | * 11/1972 | ........... G60T 8/1856 |
| JP | | 4-181132 | A | | 6/1992 |
| JP | | 2001-330503 | A | | 11/2001 |
| JP | | 2006-170352 | A | | 6/2006 |
| JP | | 4391406 | B2 | | 12/2009 |
| JP | | 2015-94438 | A | | 5/2015 |
| JP | | 2017-15680 | A | | 1/2017 |
| JP | | 6515770 | B2 | | 5/2019 |
| WO | | 89/007055 | A1 | | 8/1989 |
| WO | | 2015/159899 | A1 | | 10/2015 |
| WO | | 2016/052106 | A1 | | 4/2016 |
| WO | | 2017/098814 | A1 | | 6/2017 |

OTHER PUBLICATIONS

Written Opinion (PCT/ISA/237) dated Feb. 27, 2018 by the International Search Authority in counterpart International Patent Application No. PCT/JP2017/045094.

Office Action dated Dec. 4, 2018 by the Japanese Patent Office in counterpart Japanese patent Application No. 2018-557161.

Office Action dated Feb. 7, 2019 by the Japanese Patent Office in counterpart Japanese patent Application No. 2018-557161.

Communication dated Nov. 3, 2020 issued by the State Intellectual Property Office of P.R. China in counterpart Chinese Application No. 201780092152.0.

Communication dated May 29, 2020 issued by the European Intellectual Property Office in counterpart European Application No. 17913321.0.

* cited by examiner

VEHICLE WEIGHT MEASUREMENT DEVICE

TECHNICAL FIELD

The present invention relates to a vehicle weight measurement device, and particularly to, a vehicle weight measurement device to be incorporated to a suspension device of an automobile and configured to detect an overloading.

BACKGROUND ART

In an automobile, particularly, a commercial vehicle such as a truck and a van for transporting a variety of goods, an illegal overloaded vehicle which travels on a road with exceeding legal load capacity becomes a social issue. The reason for the overloading is that the transportation cost can be saved when carrying many goods at one time.

However, the overloading should be avoided because it can cause a variety of problems, as follows.

(1) The overloading may deteriorate motion performance of the automobile and damage constitutional components, which may cause an accident. That is, the overloading involves many causes of an accident. For example, an axle (hub) is broken, a tire is damaged (burst), a braking distance increases, a brake is overheated and poorly operates, and a vehicle is likely to overturn.

(2) The overloading causes severe damage to the road, and therefore, maintenance cost of the road increases.

There are several causes to make it difficult to prevent the overloading. One of them is that a driver, a passenger and the like cannot easily recognize the loaded weight.

That is, conventionally, a vehicle to be measured is placed on a platform scale so as to measure load of the vehicle (loaded weight measurement).

However, the installation of the platform scale requires a large facility and a large installation space, so that the installation cost increases. Therefore, the number of platform scales which can be installed is limited, so that it is physically difficult to measure many vehicles.

Accordingly, in recent years, a simple load measurement device configured to be mounted on a vehicle itself and to measure the load thereof has been suggested, as disclosed in Patent Document 1.

For example, the technique disclosed in Patent Document 1 is a simple load measurement device including: a base assembly of which two weld parts are welded to different mounting positions of a loaded member configured to expand and contract as vehicle load is applied thereto; a compression strain sensor element which is supported by the base assembly and of which an output changes as the load to be applied to the vehicle changes such that the base assembly expands and contracts in a direction in which the two weld parts come close to and separate from each other, and a circuit board mounted thereon an amplifier configured to amplify the output of the compression strain sensor element, wherein the load measurement device is configured to measure load by detecting the compression strain.

In the load measurement device, in order to swingably support a vehicle wheel (front wheel) of the vehicle in a steering direction, a thrust ball bearing (rolling bearing) is interposed between a member fixed to a vehicle side and a member to be steered, and the front wheel is swingably supported in the steering direction. In the conventional configuration using the thrust ball bearing (rolling bearing), the friction due to steering can be advantageously largely reduced.

On the other hand, in a steering system including an electronic power steering (electronic steering assistance device), the friction due to steering requires a certain range of damping in order to achieve a preferable control characteristics. For this reason, in the conventional configuration using the thrust ball bearing (rolling bearing), the friction due to steering may become so small that the damping property of the steering system may be not sufficient.

CITATION LIST

Patent Documents

Patent Document 1: JP-A-2001-330503

SUMMARY

Problems to be Solved

In view of the above circumstances, according to an aspect of the present invention, there is provided as one means for preventing an overloading of a vehicle, a vehicle weight measurement device having a structure which swingably supports vehicle body weight and has a certain damping property necessary for a steering system.

Means for Solving the Problems

A vehicle weight measurement device according to one embodiment of the present invention is provided to a suspension device and configured to swingably support a vehicle wheel in a steering direction while a bearing is interposed between a member fixed to a vehicle side and a member to be steered. The vehicle weight measurement device includes:

a mounting part having an upper surface side fixed to the vehicle side and a lower surface side provided with an opening groove portion;

a diaphragm configured to cover an opening area of the groove portion to form an oil chamber of a predetermined space together with the groove portion;

a collar having a diameter larger than an outer diameter of the opening area of the groove portion and configured to sandwich and tightly fix an outer diameter side surface portion of the diaphragm between the collar and a surface portion outside the opening area of the groove portion;

a piston configured to press the diaphragm by a resilient force of a spring; and a pressure sensor provided to the mounting part and configured to detect a change in pressure of measurement fluid in the oil chamber, which is changeable by movement of the piston.

A vehicle weight measurement device according to another embodiment of the present invention is provided to a suspension device and configured to swingably support a vehicle wheel in a steering direction while a bearing is interposed between a member fixed to a vehicle side and a member to be steered. The vehicle weight measurement device includes:

a mounting part having an upper surface side fixed to the vehicle side and a lower surface side provided with an opening groove portion;

a diaphragm configured to cover an opening area of the groove portion to form an oil chamber of a predetermined space together with the groove portion;

an annular outer collar having a diameter larger than an outer diameter of the opening area of the groove portion and configured to sandwich and tightly fix an outer diameter side surface portion of the diaphragm between the collar and a surface portion outside the opening area of the groove portion;

a first piston provided to be moveable in a longitudinal direction of the suspension device on an inner diameter side of the collar, including a flange portion arranged on a lower side of the outer collar via a gap with the outer collar, and configured to press the diaphragm by a resilient force of a spring of the suspension device;

a second piston including a flange portion in contact with a lower surface of the first piston, and a long cylindrical portion with a hollow internal space capable of accommodating a tip end portion of the suspension device inserted therein from a lower side;

a spring bush configured to receive one end of the spring;

a bearing unit interposed between the spring bush and the second piston and configured to be relatively rotatable; and a pressure sensor provided to the mounting part and configured to detect a change in pressure of measurement fluid in the oil chamber, which is changeable by movement of the pistons, wherein the bearing unit includes a thrust needle bearing swingably supporting a load in a longitudinal direction of the suspension device, and a slide bush configured not to receive a load in the longitudinal direction and configured to receive a load in a radial direction while causing constant damping to swinging.

In the above vehicle weight measurement device, the thrust needle bearing may include:

a pair of annular races arranged on upper and lower sides to face each other and configured to be relatively rotatable;

a plurality of needle rollers arranged along a bearing internal space formed between the pair of races; and a cage configured to rotatably hold the plurality of needle rollers, the bearing unit may include:

an upper case arranged in contact with an upper race of the thrust needle bearing; and a lower case arranged in contact with a lower race of the thrust needle bearing, and the lower race may be provided with a seal between the lower race and the upper case.

In the above vehicle weight measurement device, the uppercase and the lower case of the bearing unit may be provided with a holding mechanism configured to prevent disassembly.

In the above vehicle weight measurement device, the holding mechanism may include engagement claws provided on the upper case and the lower case and configured to engage with each other.

A vehicle weight measurement device according to still another embodiment of the present invention is provided to a suspension device and configured to swingably support a vehicle wheel in a steering direction while a bearing is interposed between a member fixed to a vehicle side and a member to be steered, the vehicle weight measurement device including:

a mounting part having an upper surface side fixed to the vehicle side and a lower surface side provided with an opening groove portion;

a diaphragm configured to cover an opening area of the groove portion to form an oil chamber of a predetermined space together with the groove portion;

a collar having a diameter larger than an outer diameter of the opening area of the groove portion and configured to sandwich and tightly fix an outer diameter side surface portion of the diaphragm between the collar and a surface portion outside the opening area of the groove portion;

a piston configured to press the diaphragm by a resilient force of a spring; and a pressure sensor provided to the mounting part and configured to detect a change in pressure of measurement fluid in the oil chamber, which is changeable by movement of the piston, wherein the bearing is a thrust needle bearing and is interposed between the diaphragm and the piston.

In the above vehicle weight measurement device, a thrust plate may be interposed between the thrust needle bearing and the diaphragm.

In the above vehicle weight measurement device, a non-rotating mechanism is provided in a facing area between the thrust plate side and the collar side.

Effects of the Invention

According to the configure described above, a vehicle weight measurement device can be provided as one means for preventing an overloading of a vehicle, which has a structure which swingably supports vehicle body weight and has a certain damping property necessary for a steering system.

DETAILED DESCRIPTION THE EMBODIMENTS

Hereinafter, embodiments of a vehicle weight measurement device will be described with reference to the drawings.

The embodiments relate to an example where a vehicle weight measurement device is provided to a suspension device (suspension) 1 of an automobile. The vehicle weight measurement device of the embodiments is configured to swingably support a vehicle wheel in a steering direction while a bearing is interposed between a member fixed to the vehicle side and a member to be steered.

The embodiments are mere embodiments of the present invention, are not construed to limit the present invention and can be modified within the scope of the present invention.

First Embodiment

FIGS. 1 to 5 illustrate a first embodiment of the present invention.

Although not shown, for example, an upper side of the suspension device (suspension) 1 is fixed to a main body frame (cross member) of an automobile via a mounting part (top plate) 7, and a lower side thereof is fixed to an axle via a lower arm pivotably provided to a frame.

Figure 1:
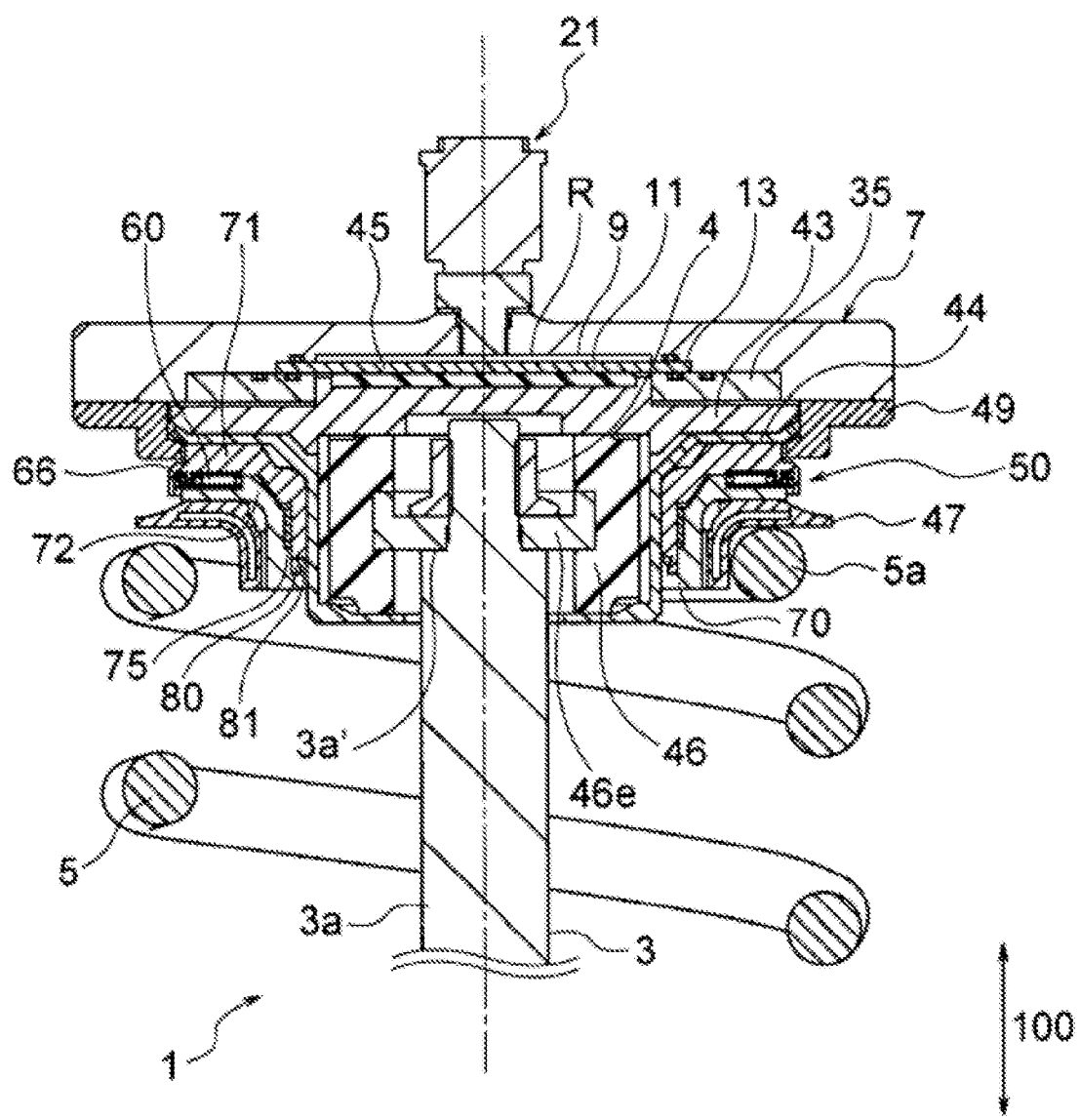
FIG. 1 is a longitudinal sectional view illustrating a state where a vehicle weight measurement device of a first embodiment is incorporated to a suspension device.
Figure 2:
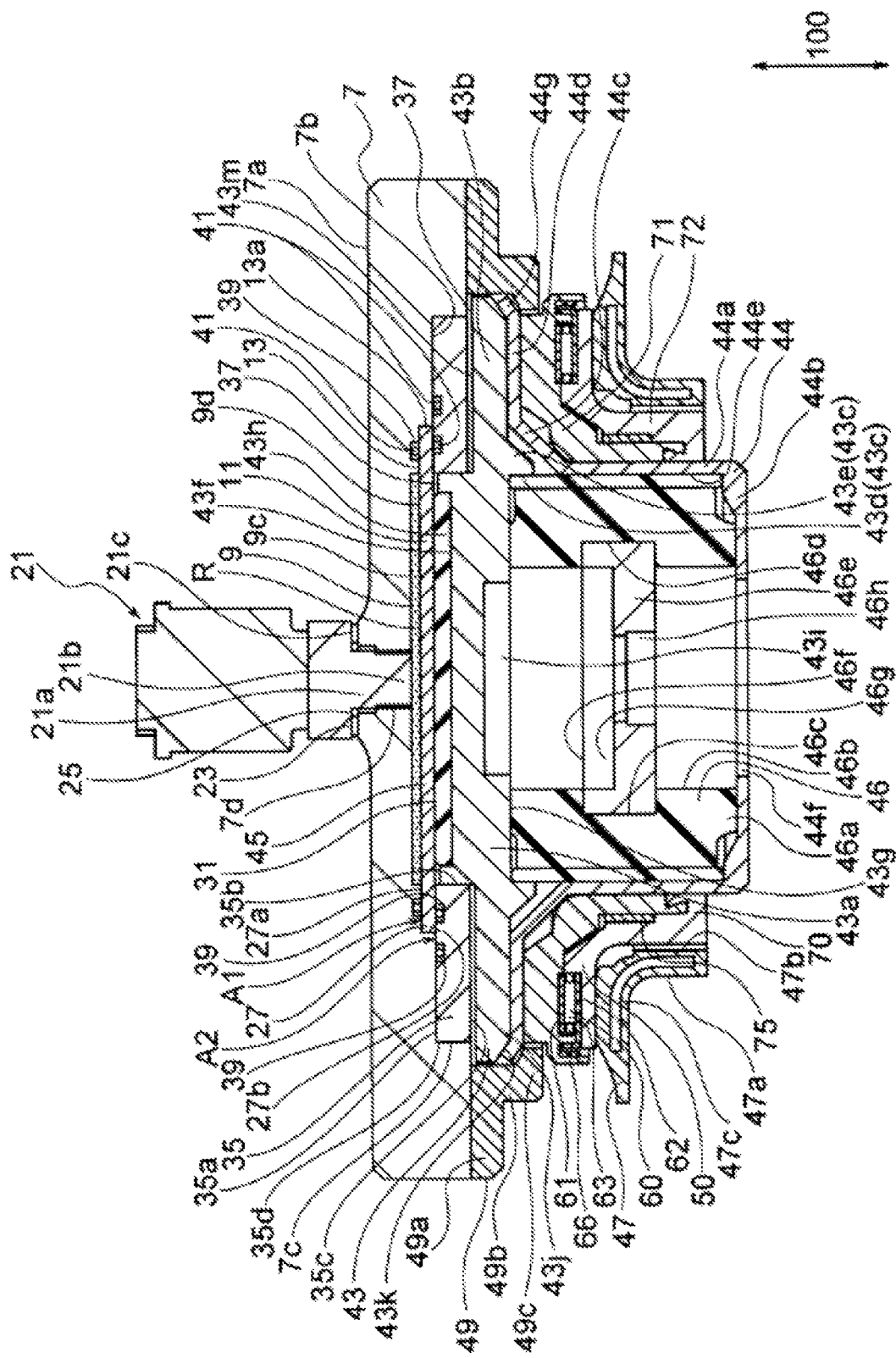
FIG. 2 is a longitudinal sectional view illustrating the vehicle weight measurement device of the first embodiment.
Figure 3:
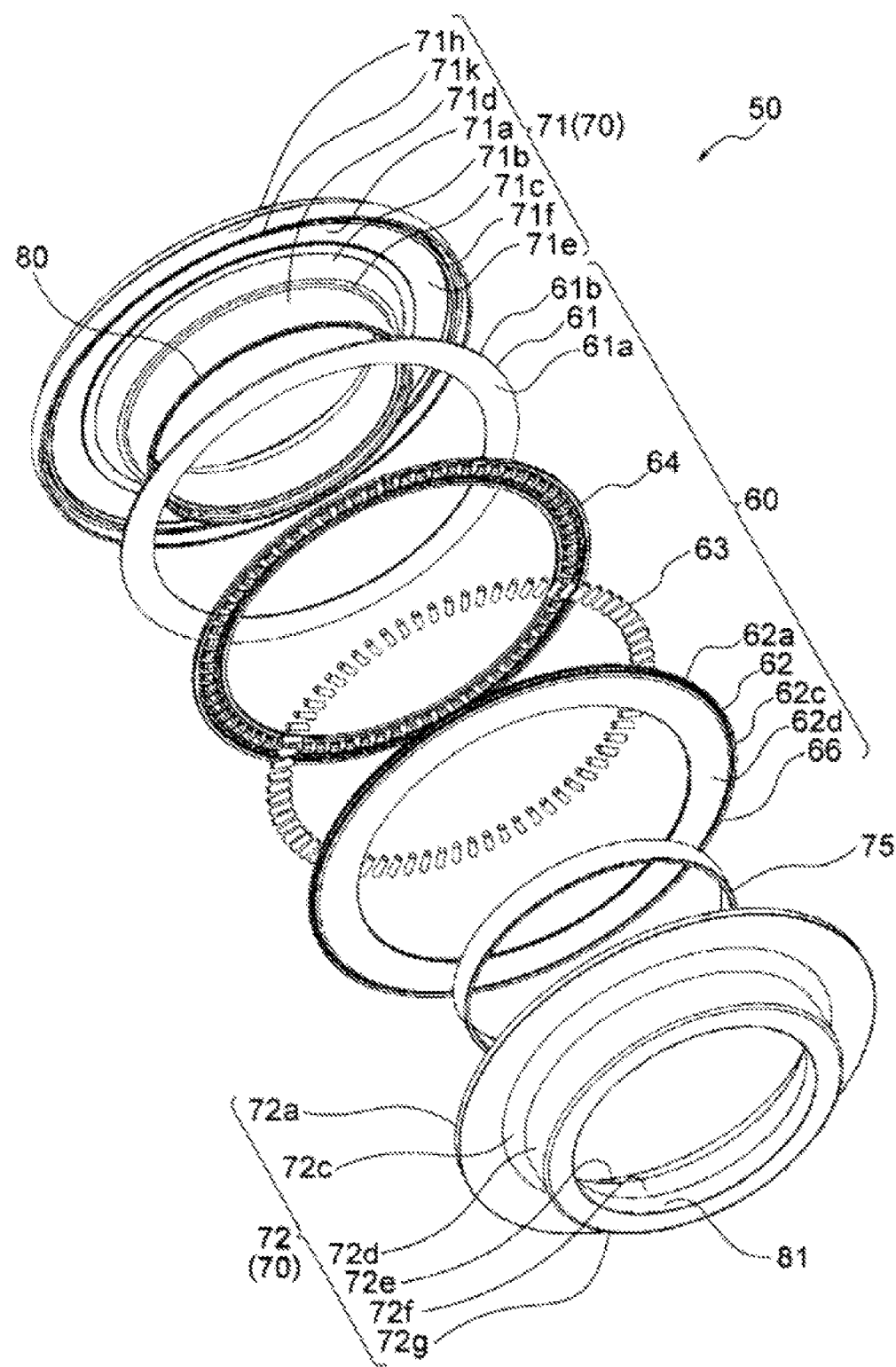
FIG. 3 is a schematic exploded perspective view illustrating a configuration of a bearing unit.
Figure 4:
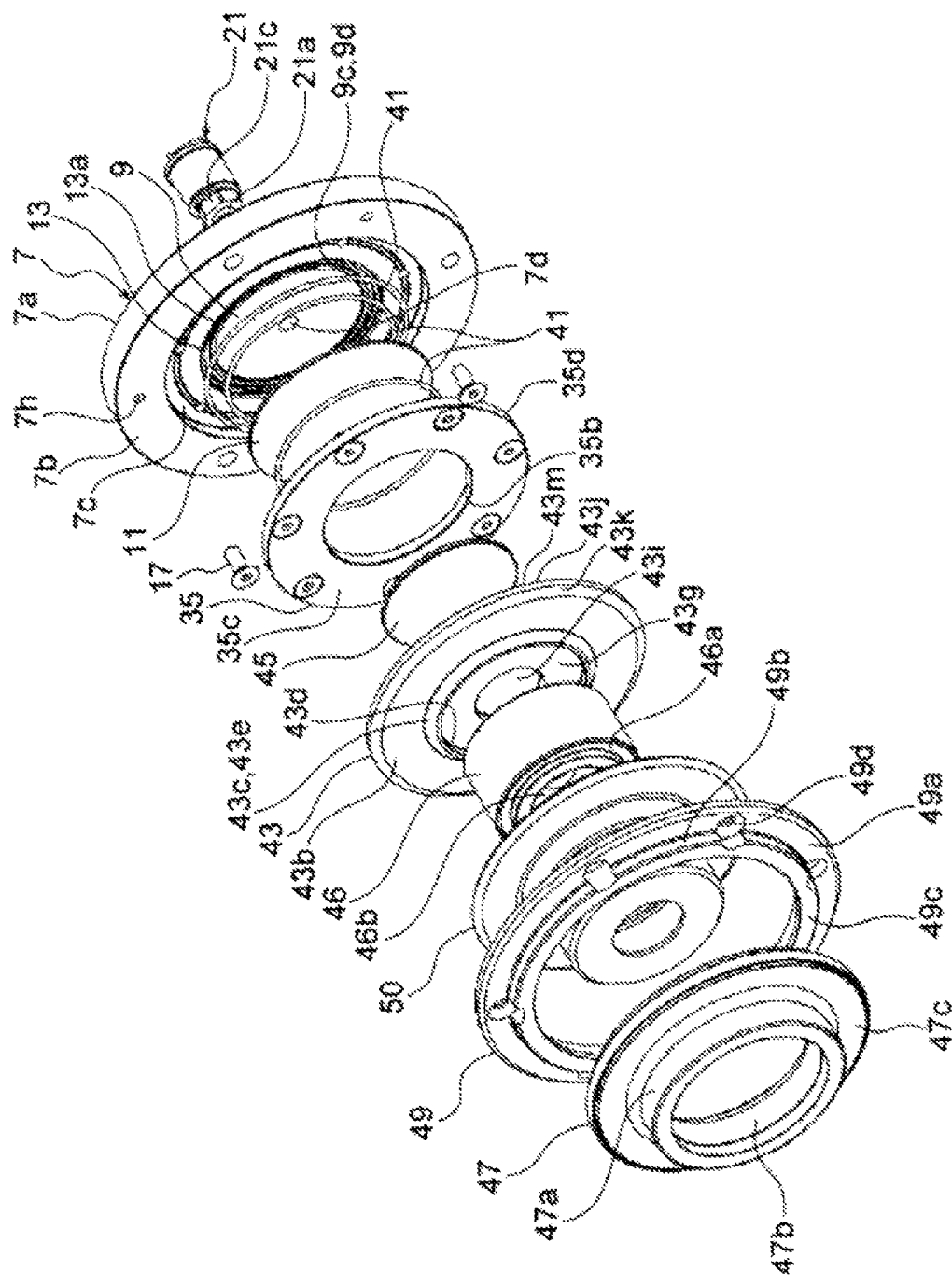
FIG. 4 is a schematic exploded perspective view illustrating a configuration of the vehicle weight measurement device of the first embodiment.
Figure 5:
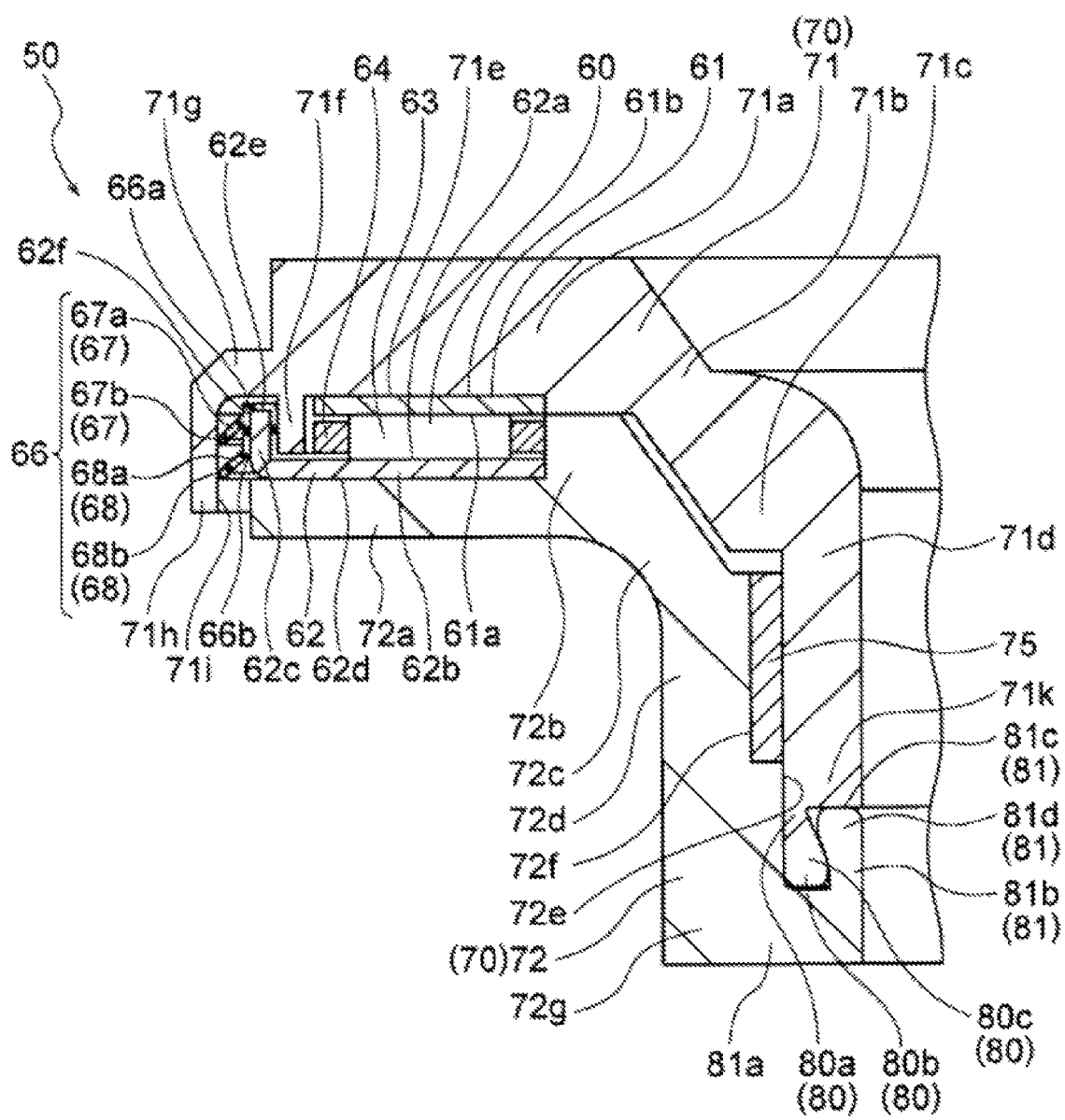
FIG. 5 is a longitudinal sectional view illustrating the configuration of the bearing unit.

The suspension device 1 shown in FIG. 1 has a known configuration, except that the vehicle weight measurement device of the first embodiment is incorporated thereto, should not be construed to be limited to the shown examples and can be modified within the scope of the present invention.

In FIG. 1, a reference numeral 3 indicates a rod of a shock absorber, and a reference numeral 5 indicates a coil spring.

Hereinafter, the vehicle weight measurement device will be described, and the description on other configurations of the suspension device will be omitted.

The vehicle weight measurement device includes the mounting part (top plate) 7 fixed to a vehicle side, an outer collar 35 provided on a lower surface 7b of the mounting part 7, a diaphragm 11 sandwiched and fixed by the mounting part 7 and the outer collar 35, a first piston 43 in contact with the diaphragm 11 and configured to press the diaphragm 11 in a vertical direction (a direction denoted with an arrow 100 in the drawing), a pad 45 disposed between the first piston 43 and the diaphragm 11, a second piston 44 in contact with the first piston 43 and configured to press the first piston 43 in the vertical direction, a spring bush 47 configured to receive one end (upper end) of the coil spring 5 of the suspension device 1, a bearing unit 50 interposed between the second piston 44 and the spring bush 47, an oil chamber 9 formed between the mounting part 7 and the diaphragm 11 and having a predetermined measurement fluid (operating oil) R filled therein, and a pressure sensor 21 provided on an upper surface 7a of the mounting part 7 and configured to detect a change in pressure of the measurement fluid R filled in the oil chamber 9 (refer to FIGS. 1 to 5).

In the first embodiment, members including an upper case 71 and above in the vertical direction is a member fixed to the vehicle side, and members including a lower case 72 and below in the vertical direction is a member to be steered. The bearing unit 50 is configured by interposing a thrust needle bearing 60 between the upper case 71 and the lower case 72, and the vehicle wheel is swingably supported in the steering direction.

The mounting part (top plate) 7 is formed to have a short cylindrical shape having a predetermined thickness, and has the upper surface 7a fixed to the vehicle side, the lower surface 7b formed with a groove portion 9c opening in a cylindrical shape, and an annular wall part 7c protruding in a cylindrical shape downwards from an outer peripheral end in the vertical direction.

The groove 9c opening in a cylindrical shape is formed toward the upper surface 7a of the mounting part 7 in a diaphragm accommodating concave portion 13 concaved in a cylindrical shape on the lower surface 7b of the mounting part 7.

The diaphragm accommodating concave portion 13 has a surface portion 13a formed in an annular shape having a predetermined width at an outer diameter side of the groove portion 9c.

The upper surface 7a of the mounting part 7 facing a vehicle-side is formed with a sensor coupling part 7d to which the pressure sensor 21 can be coupled. The sensor coupling part 7d penetrates the mounting part 7 in the vertical direction from the upper surface 7a to the groove portion 9c.

The sensor coupling portion 7d and the pressure sensor 21 are required to be connected such that the measurement fluid R does not leak.

The mounting part 7 is formed with a plurality of bolt insertion holes in which fixing bolts are to be inserted so as to fasten and fix the same to the main body frame (for example, the cross member) of the automobile, and a plurality of bolt fixing holes 7h in which coupling bolts 17 are to be fastened so as to fix a stopper part 49 (described later).

The pressure sensor 21 is configured to detect a change in pressure of the measurement fluid R filled in the oil chamber 9. For example, a known structure may be used, which is configured to measure a pressure and convert the pressure into a voltage signal and to transmit the signal. The pressure sensor is not particularly limited and an optimal sensor can be appropriately selected within the scope of the present invention.

In the first embodiment, the detecting portion 21a is inserted into the sensor coupling portion 7d, a tip end detecting surface 21b is arranged to face an inside of the oil chamber 9, and a abutting flange surface portion 21c stands in the vertical direction to be closely contacted to an opening edge of the sensor coupling portion 7d.

In the first embodiment, a washer 23 is interposed and fixed between the abutting flange surface portion 21c and the opening edge portion of the sensor coupling portion 7d. In order to prevent the measurement fluid from being leaked, a predetermined sealing member, an O-ring 25 is arranged in the first embodiment.

The pressure sensor 21 is not necessarily required to be disposed at the center of the upper surface 7a of the top plate 7. For example, the sensor coupling portion 7d may be provided at an arbitrary position of the upper surface 7a of the mounting part 7 as long as the tip end detecting surface 21b faces the inside of the oil chamber 9. That is, the pressure sensor can be arranged at any position where no problem is caused upon the mounting to the vehicle body side.

The diaphragm 11 has a cylindrical shape configured to cover an opening area 9d of the groove portion 9c to form the oil chamber 9 of a predetermined space together with the groove portion 9c, and is fitted in the cylindrical diaphragm accommodating concave portion 13 formed on the lower surface 7b of the mounting part 7.

In the first embodiment, the diaphragm 11 includes a sealing area 27 which is thick and has an annular shape at an outer diameter side, and a pressing area 31 is deformable and configured to be thinly coupled at an inner diameter side of the sealing area 27.

The pressing area 31 is configured to have a width capable of covering the opening area 9d of the groove portion 9c, and the oil chamber 9 of a predetermined area is formed by the pressing area 31 and the groove portion 9c of the mounting part 7.

The sealing area 27 is formed thicker than a depth of the diaphragm accommodating concave portion 13 in the vertical direction, and is configured to have thicknesses so as to be compressed and sealed when being sandwiched by the outer collar 35.

A material of the diaphragm 11 has flexibility and durability (cold resistance/wear resistance/oil resistance) and is not particularly limited. However, for example, nitrile rubber, Teflon (registered trademark), chloroprene rubber, fluorine rubber, ethylenepropylene rubber or the like may be used, depending on a characteristic of the fluid. A diaphragm formed of metal such as thin stainless steel may be also used.

The oil chamber 9 is fully hermetically filled with the predetermined measurement fluid R without generating air bubbles. A pressure of the measurement fluid R can be changed by movement of the first piston 43 (described later).

In the first embodiment, the outer collar 35 is formed to have a predetermined short cylindrical shape having a thickness in the vertical direction so as to enter an area surrounded by the annular wall part 7c of the mounting part 7. The outer collar 35 is formed to have an outer diameter 35d which can be fitted to an inner peripheral surface of the annular wall portion 7c of the mounting part 7 and an inner diameter defined by an annular inner surface 35b located inside an outer side surface 13b of the diaphragm accommodating concave portion 13.

The sealing area 29 of the diaphragm 11 is tightly fixed with being sandwiched between an upper surface 35a of the outer collar 35 and a surface portion (the outer side surface portion 13b of the diaphragm accommodating concave portion 13) of the lower surface 7b of the mounting part 7 located at an outer side than the opening area 9d of the groove portion 9c.

In the first embodiment, a tight fixing area A1 of the upper surface portion 27a of the sealing area 27 of the diaphragm 11, and a tight fixing area A2 between the lower surface portion 27b of the sealing area 27 of the diaphragm 11 and the upper surface 35a of the outer collar 35 adopt a sealing structure by a surface seal, respectively.

A sealing structure by a separate seal member is adopted, in addition to the sealing structures of the surface seals.

In the first embodiment, an annular seal groove 39 is provided on the surface portion 13a of the diaphragm accommodating concave portion 13, and an O-ring 41 is inserted such that the O-ring 41 is compressed and seals with the upper surface portion 27a of the sealing area 27.

The upper surface 35a of the outer collar 35 is provided with two annular seal grooves 39 having large and small diameters, and the O-rings 41 are inserted in the seal grooves 39, so that the O-rings 41 are compressed and seal with the lower surface portion 27b of the sealing area 27, and with the lower surface 7b of the mounting part 7.

Since the O-rings 41 are compressed and seal with the upper surface portion 27a of the sealing area 27, it is possible to sufficiently reduce or prevent the measurement fluid R from being leaked from the oil chamber 9. Further, according to the first embodiment, since the multiple sealing structures are adopted as described above, even though the measurement fluid R is leaked from the sealing structure of the sealing area 27, the measurement fluid R can be prevented from being leaked by the other sealing structure, so that it is possible to securely prevent the measurement fluid R from being leaked from the oil chamber 9. Therefore, it is possible to highly improve the sealing reliability.

In the first embodiment, since the sealing structure is provided in the area without relative movement, the seal durability is also high.

Each seal member may have any configuration where one member configuring the sealing and fixing area or the contact area is provided with the seal groove 39 and the O-ring 41 is inserted in the seal groove 39, so that the O-ring 41 is compressed and seal between the one member and the other member. That is, the present invention is not limited to the configuration as to whether the seal groove 39 and the O-ring 41 are provided at one member or the other member, and any of the configurations may be used.

In the first embodiment, the first piston 43 includes a cylindrical portion 43a having an outer diameter in sliding contact with an annular inner surface portion 35b (inner diameter of the outer collar 35) of the outer collar 35, a flange portion 43b provided to integrally extend in a horizontal direction from the outer diameter of the cylindrical portion 43a and having a diameter larger than the outer diameter of the outer collar 35, and a tapered cylindrical portion 43c formed of an annular inner surface portion 43d and a tapered outer surface portion 43e, which is formed to extend downwards integrally from an inner diameter of the flange portion 43b.

A chamfered portion 43k is formed on an outer periphery end 43j of the lower surface of the flange portion 43b.

An upper groove portion 43h opening in a cylindrical shape having a diameter smaller than that of the groove portion 9c of the mounting part 7 is formed on an upper surface 43f side of the cylindrical portion 43a, and a lower groove portion 43i opening in a cylindrical shape having a diameter smaller than that of the upper groove portion 43h is formed on a lower surface 43g side of the cylindrical portion 43a.

The upper groove portion 43h of the first piston 43 is fitted with a cylindrical pad 45 which covers the opening area of the upper groove portion 43h and is thicker than the depth of the upper groove portion 43h in the vertical direction. The pad 45 is thicker than the depth of the upper groove portion 43h in the vertical direction, so that in a state where an upper surface of the pad 45 is in contact with a lower surface of the diaphragm 11, a gap 37 is set between the upper surface 43f of the cylindrical portion 43a of the first piston 43 and the diaphragm 11, and between the upper surface 43m of the flange portion 43b of the first piston 43 and a lower surface 35c of the outer collar 35. Accordingly, the first piston 43 is configured to be movable in the vertical direction.

Although not particularly limited, since the pad 45 is configured to slide between the diaphragm 11 and the first piston 43, the pad is preferably formed of a rigid synthetic resin material having a high self-lubricating property, for example, polyacetal resin such as Delrin (registered trademark) or the like. A groove provided on the upper surface of the pad 45 may be filled with a lubricant to lubricate a sliding surface between the pad 45 and the diaphragm 11. In the meantime, the first piston 43 may be directly contacted to the diaphragm without the pad 45.

In the first embodiment, the second piston 44 includes a thin long cylindrical portion 44a having an annular inner peripheral surface 44e with the same diameter as that of an annular inner surface portion 43d (inner surface of the tapered cylindrical portion 43c) of the first piston 43; a thin bottom portion 44b integrally extending in the horizontal direction from a lower end of the long cylindrical portion 44a and having a rod insertion hole 44f at the center; a thin tapered cylindrical portion 44c integrally provided upward in the vertical direction in an expanding manner from an upper end of the long cylindrical portion 44a; and a thin flange portion 44d integrally extending in the horizontal direction from an outer periphery end of the tapered cylindrical portion 44c to have the same outer diameter as the flange portion 43b of the first piston 43.

An outer diameter end of the flange portion 44d is formed such that an engaging portion 44g is formed along the chamfered portion 43k of the flange portion 43b of the first piston 43 so as to extend upward in the vertical direction in an expanding manner.

In an inner space of the long cylindrical portion 44a of the second piston 44, an in-bush metal member 46e fitted to the center of a rubber bush 46 is stored together with the rubber bush 46 having a long cylindrical shape.

A fitting concave portion 46c is formed at a center position in the vertical direction of an inner peripheral surface 46b of the rubber bush 46. The in-bush metal member 46e is fitted in the fitting concave portion 46c.

In the first embodiment, for example, an engaging area 46a is formed on an inner diameter side of the rubber bush 46, which is thicker in the vertical direction than an outer diameter side. The engaging area 46a is formed to be thicker than the depth of the long cylindrical portion 44a of the second piston 44 in the vertical direction so as to protrude upwards and downwards therefrom and is sandwiched by the lower surface 43g of the cylindrical portion 43a of the first piston 43 so as to firmly hold the in-bush metal member 46e fitted in the fitting concave portion 46c.

The in-bush metal member 46e has an outer diameter the same as that of an inner peripheral surface 46d of the fitting concave portion 46c of the rubber bush 46, and an upper groove portion 46g opening in a cylindrical shape with the same diameter as the inner peripheral surface 46b of the rubber bush 46 is formed at the center on the upper surface 46f side of the in-bush metal member 46e. The upper groove portion 46g is provided at the center thereof with a rod insertion hole 46h penetrating in an upper-lower direction. The rod insertion hole 46h is provided with a receiving portion to which a step portion 3a' of a tip end of a rod 3a can be contacted, so that a large diameter hole and a small diameter hole are continuously formed.

The second piston 44 is configured to be moveable in a longitudinal direction of the suspension device 1 while the tip end of the rod 3a, which is inserted in the rod insertion hole 46h of the in-bush metal member 46e in the inner space of the long cylindrical portion 44a, of a shock absorber 3 configuring the suspension device 1 protruding to the upper surface 46f side of the in-bush metal member 46e, is attached and fastened via a nut 4, and the fastening portion is supported by the rubber bush 46.

The pad 45 fitted in the upper groove portion 43h of the first piston 43 presses the diaphragm 11 by the resilient force of a spring 5 of the suspension device 1 via the flange portion 43b of the first piston 43 which is in close contact with the flange portion 44d of the second piston 44 in the vertical direction.

The bearing unit 50 is configured to be interposed and relatively rotatable between a lower surface of the flange portion 44d of the second piston 44 and an upper surface of a flange portion 47c of the spring bush 47 (described later). In the first embodiment, the bearing unit 50 includes the thrust needle bearing 60 configured to swingably support a load in the longitudinal direction of the suspension device, a slide bush 75 configured not to receive a load in the longitudinal direction and configured to receive a load in the radial direction while causing constant damping to swinging, and a case 70 which accommodates the thrust needle bearing 60 and the slide bush 75 (see FIG. 5).

The thrust needle bearing 60 includes an upper race (upper bearing ring) 61 and a lower race (lower bearing ring) 62 arranged on the upper and lower sides to face each other and configured to be relatively rotatable, a plurality of needle rollers 63 as rolling elements arranged along a bearing internal space formed between the pair of races 61 and 62, and a cage 64 configured to rotatably hold the plurality of needle rollers 63.

The upper race 61 is formed in an annular shape having a raceway surface 61a on a lower surface thereof.

The lower race 62 has a raceway surface 62a on an upper surface thereof and includes an annular portion 62b formed wider than the upper race 61 and a cylindrical portion 62c standing from an outer diameter end of the annular portion 62b integrally.

The upper race 61 and the lower race 62 are assembled such that the raceway surface 61 and the raceway surface 62 face each other.

The case 70 is configured to sandwich the thrust needle bearing 60 by the upper case 71 and the lower case 72.

The upper case 71 is interposed between the upper surface 61b of the upper race 61 of the thrust needle bearing 60 and the lower surface of the flange portion 44d of the second piston 44, and the lower case 72 is interposed between the lower surface 62d of the lower race 62 of the thrust needle bearing 60 and flange portion 47c of the spring bush 47 (described later).

In the first embodiment, the upper case 71 includes a large diameter annular portion 71a which is provided on a lower surface thereof with a fitting concave portion 71e to which the upper race 61 is fitted, and covers the upper surface 61b of the upper race 61 of the thrust needle bearing 60 from the fitting portion 44g (the outer diameter end of the flange portion 44d) of the flange portion 44d of the second piston 44; a tapered cylindrical portion 71b which is integrally extending downwards in the vertical direction in a shape expanding from an inner diameter of the large diameter annular portion 71a; a step portion 71c which is integrally provided in the horizontal direction from the lower end of the tapered cylindrical portion 71b to the long cylindrical portion 44a of the second piston 44; and a cylindrical portion 71d which integrally extends downwards from the step portion 71c in the vertical direction along the long cylindrical portion 44a of the second piston 44.

The uppercase 71 is formed with a thin cylindrical portion 71f which integrally extends downward from an outer diameter of the large diameter annular portion 71a and is formed to have a slight gap with the annular portion 62b of the lower race 62; an extending annular portion 71g provided over the cylindrical portion 62c of the lower race 62 in the outer diameter direction and integrally from the outer diameter of the large diameter annular portion 71a in the horizontal direction; and a hanging cylindrical portion 71h which has a predetermined gap from the cylindrical portion 62c of the lower race 62 at the outer diameter of the extending annular portion 71g, and extends downwards over the annular portion 62b of the lower race 62 thinly.

In the first embodiment, the lower case 72 includes a large diameter annular portion 72a which covers the lower surface 62d of the lower race 62 of the thrust needle bearing 60; a thick portion 72b which is provided to be thick with a small gap with the large diameter annular portion 71a of the upper case 71 and extend in the horizontal direction from the inner diameter of the large diameter annular portion 72a; a tapered cylindrical portion 72c which is provided integrally downwards in the vertical direction in a shape expanding from an inner diameter of the thick portion 72b and faces the tapered cylindrical portion 71b of the upper case 71 with a gap; and a cylindrical portion 72d which extends downwards integrally from the lower end of the tapered cylindrical portion 72c in the vertical direction and faces the cylindrical portion 71*d* of the upper case 71. An accommodating concave portion 72*f* is formed on the inner peripheral surface 72*e* of the cylindrical portion 72*d* so as to face the cylindrical portion 71*d* of the upper case 71.

The slide bush 75 is accommodated in the accommodating concave portion 72*f* and is formed in a cylindrical shape with a thickness which is in sliding contact with the cylindrical portion 71*d* of the facing upper case 71.

A material of the slide bush 75 may be any material having wear resistance and a predetermined damping characteristic and is not particularly limited. However, for example, a resin material such as Teflon (registered trademark) or the like may be used.

In the first embodiment, the thrust needle bearing 60 disposed in a thrust manner largely reduces the friction when swinging in a steering direction, and swingably supports the vehicle body weight. The slide bush 75 is arranged in the vertical direction between the cylindrical portion 71*d* of the upper case 71 and the cylindrical portion 72*d* of the lower case 72. Accordingly, the vehicle weight is not loaded on the slide bush 75, and the slide bush 75 is in sliding contact with the cylindrical portion 71*d* of the upper case 71, so that predetermined damping can be generated to swinging of the lower case 72 in the turning direction.

In the bearing unit of the first embodiment, a seal 66 is provided in order to prevent the entry of foreign matters from the outside of the bearing unit.

In the seal 66, the cylindrical portion 62*c* of the lower race 62 is used as a metal insert, elastic material 66*a* covers from a part of an axially inner side surface toward an upper surface 62*e* of the cylindrical portion 62*c* to the entire surface of the axially outer side surface (outer peripheral surface) 62*f*, and a first lip 67 and a second lip 68 are integrally formed from the portion where the axially outer side surface (outer peripheral surface) 62*f* is covered.

For the seal 66, for example, known elastic materials such as rubber and elastomer are appropriately selected and adopted within the scope of the present invention.

The first lip 67 is inclined downward from a base portion 67*a* toward an inner peripheral surface 71*i* of the hanging cylindrical portion 71*h* of the upper case 71 on an outer peripheral side 66*b* of the seal 66, and protrudes over the entire periphery to form into a substantially umbrella shape, and a lip tip end 67*b* is in sliding contact with the inner peripheral surface 71*i* of the hanging cylindrical portion 71*h*. That is, a sealing area is configured by sliding contact between the first lip 67 and the inner peripheral surface 71*i* of the hanging cylindrical portion 71*h*, so that foreign matters do not intrude into the inside (space) of the bearing.

The second lip 68 is provided on an outer air side of the first lip 67, is inclined downward from a base portion 68*a* toward the inner peripheral surface 71*i* of the hanging cylindrical portion 71 of the upper case 71 on an outer peripheral side 66*b* of the seal 66, and protrudes over the entire periphery to form into a substantially umbrella shape, and a lip tip end 68*b* is in sliding contact with the inner peripheral surface 71*i* of the hanging cylindrical portion 71*h*. That is, a sealing area is configured by sliding contact between the second lip 68 and the inner peripheral surface 71*i* of the hanging cylindrical portion 71*h* on the outer air side of the first lip 67, so that foreign matters do not intrude into the inside (space) of the bearing.

Further, the lower race 62 is disposed adjacently facing the extending annular portion 71*g* and the thin cylindrical portion 71*f* of the upper case 71, so that a labyrinth gap is formed to configure the sealing area.

The upper case 71 and the lower case 72 are provided with a holding mechanism for preventing the case 70 from being disassembled.

In the first embodiment, the holding mechanism includes, for example, an upper case side claw portion (engagement claw) 80 provided at a lower end 71*k* of the cylindrical portion 71*d* of the upper case 71, and a lower case side claw portion (engagement claw) 81 provided at a lower end 72*g* of the cylindrical portion 72*d* of the lower case 72 which are engaged with each other.

The upper case side claw portion 80 extends downwards from the lower end 71*k* of the cylindrical portion 71*d* of the upper case 71, in which a bulging portion 80*c* smoothly protrudes in the inner diameter direction from the base portion 80*a* to a tip end side 80*b*.

The lower case side claw portion 81 is provided integrally from the lower end 72*g* of the cylindrical portion 72*d* of the lower case 72 in the horizontal direction over the upper case side claw portion 80, in which an extending portion 81*a* having an inner peripheral surface with the same diameter as the cylindrical portion 71*d* of the upper case 71 extends to the lower end 71*k* of the cylindrical portion 71*d* of the upper case 71, and a bulging portion 81*c* smoothly protrudes in the outer diameter direction from the base portion 81*a* to a tip end side 81*c*.

When the upper case 71 and the lower case 72 are assembled, the upper case side claw portion 80 is pushed into the gap between the lower case side claw portion 81 and the cylindrical portion 72*d* of the lower case 72, so that the bulging portion 80*c* of the upper case side claw portion 80 and the bulging portion 81*d* of the lower case side claw portion 81 are engaged and fitted with each other to prevent the bearing unit 50 from disassembling.

In the first embodiment, in order to facilitate the assembly work of the upper case 71 and the lower case 72, the lower case 72 is formed of a material with elasticity (elastic material). For example, the lower case 72 of the first embodiment is formed of a resin material.

Since the lower case 72 is formed of the resin material, it is easy to push the lower case side claw portion 81 to be apart from the cylindrical portion 72*d* of the lower case 72 due to the elasticity. For this reason, when the upper case 71 and the lower case 72 are assembled, the upper case side claw portion 80 is easily inserted into the gap between the lower case side claw portion 81 and the cylindrical portion 72*d* of the lower case 72, so that the work of engaging the bulging portion 80*c* of the upper case side claw portion 80 and the bulging portion 81*d* of the lower case side claw portion 81 becomes easy.

The elastic material which forms the lower case 72 has a hardness (softness) to an extend that the lower case side claw portion 81 is easily spread, and the bulging portion 80*c* of the upper case side claw portion 80 and the bulging portion 81*d* of the lower case side claw portion 81 cannot be easily disassembled after the upper case 71 and the lower case 72 are assembled.

In the first embodiment, the resin material is selected as the elastic material which forms the lower case 72, but the present invention is not limited thereto, and the material can be selected as long as the upper case side claw portion 80 and the lower case side claw portion 81 can be easily and reliably engaged with each other.

Further, in order to facilitate the engaging work between the bulging portion 80*c* of the upper case side claw portion 80 and the bulging portion 81*d* of the lower case side claw portion 81, in the first embodiment, slits (not shown) are formed at positions with predetermined intervals therebetween in the circumferential direction on the lower end 72g side of the cylindrical portion 72d of the lower case 72.

As described above, due to the slits formed on the lower case 72, in the engaging work between the bulging portion 80c of the upper case side claw portion 80 and the bulging portion 81d of the lower case side claw portion 81, the lower end 72g of a part of the cylindrical portion 72d of the lower case 72 in the circumferential direction is bent with the slits, so that the lower case side claw portion 81 is spread to be apart from the cylindrical portion 72d of the lower case 72, and therefore, the engaging work is facilitated.

The number and length of the slits formed in the lower case 72 may be appropriately selected.

In the first embodiment, a structure in which engagement claws of the upper case side claw portion 80 and the lower case side claw portion 81 are engaged with each other is adopted as the holding mechanism, but other structures may be adopted as long as the disassembling of the upper case 71 and the lower case 72 can be prevented. For example, the lower end 71k of the cylindrical portion 71d of the upper case 71 and the lower end 72g of the cylindrical portion 72d of the lower case 72 may be overlapped, and the lower end 71k and the lower end 72g may be engaged with a clip-like member.

The spring bush 47 includes a large-diameter cylindrical portion 47a having a cylindrical through hole 47b capable of mounting the cylindrical portion 72d of the lower case 72 of the bearing unit 50, and a flange portion 47c integrally extending outwards in the horizontal direction from an upper end of the large-diameter cylindrical portion 47a. The large-diameter cylindrical part 47a has opened upper and lower surfaces.

One end (upper end) 5a of the coil spring 5 configuring the suspension device 1 is abutted to a lower surface of the flange part 47c in the vertical direction (refer to FIG. 1).

The stopper part 49 is adopted to improve the attachment workability to the suspension device 1. In the first embodiment, the stopper part 49 includes an annular mounting portion 49a having a circle ring shape of which an outer diameter is the same as the mounting part 7 and an inner diameter is slightly greater than the flange portion 43b of the first piston 43 and the flange portion 44d of the second piston 44, a cylindrical portion 49b extending downwards in the vertical direction toward the lower side from the inner diameter of the annular mounting portion 49a, and an engaging collar portion 49c protruding inward in the horizontal direction from a lower end of the cylindrical portion 49b and having a diameter slightly larger than the large diameter annular portion 71a of the upper case 71 of the bearing unit 50.

The annular mounting portion 49a is formed with bolt insertion holes 49d arranged coaxially in the vertical direction with the bolt fixing holes 7h of the mounting part 7.

Therefore, when the bolt insertion hole 49d of the stopper part 49 are arranged to coaxially communicate with the bolt fixing hole 7h of the mounting part 7, which are then fastened with the coupling bolt 17, the engaging collar portion 49c is engaged with the flange portion 44d of the second piston 44 so as to receive the same from below in the vertical direction, so that the first piston 43 and the second piston 44 can be integrated with the mounting part 7 so as to be movable in the vertical direction within a range of the gap 37 (the gap 37 between the upper surface 43f of the cylindrical portion 43a of the first piston 43 and the diaphragm 11, and the gap 37 between the upper surface 43m of the flange portion 43b of the first piston 43 and the lower surface 35c of the outer collar 35).

Second Embodiment

FIGS. 6 to 8C illustrate a second embodiment of the present invention.

A vehicle weight measurement device of the second embodiment includes a mounting part (top plate) 7 fixed to a vehicle-side, a collar 35 provided on a lower surface 7b of the mounting part 7, a diaphragm 11 sandwiched and fixed by the mounting part 7 and the collar 35, a first piston 43 in contact with the diaphragm 11 and configured to press the diaphragm 11 in a vertical direction (a direction denoted with an arrow 100 in the drawing), a second piston 44 in contact with the first piston 43 and configured to press the first piston 43 in the vertical direction, a spring bush (spring seat) 47 configured to receive one end (upper end) of the coil spring 5 of the suspension device 1, an oil chamber 9 formed between the mounting part 7 and the diaphragm 11 and having a predetermined measurement fluid (operating oil) R filled therein, and a pressure sensor 21 provided on an upper surface 7a of the mounting part 7 and configured to detect a change in pressure of the measurement fluid R filled in the oil chamber 9 by the movement of the pistons (first piston 43, second piston 44)(refer to FIGS. 6 to 8C).

Unlike the first embodiment, in the second embodiment, members including the collar 35, the mounting part 7, the diaphragm 11 and the above in the vertical direction is a member fixed to the vehicle side, and members including the first piston 43 and below in the vertical direction is a member to be steered. The thrust needle bearing 60 is interposed between the member fixed to the vehicle side including the collar 35, the mounting part 7 and the diaphragm 11, and the member to be steered including the first piston 43; the member fixed to the vehicle side is configured to be rotatable relative to the member to be steered; and the vehicle wheel is swingably supported in the steering direction.

In the second embodiment, a thrust plate 90 is interposed between the thrust needle bearing 60 and the diaphragm 11.

That is, in the first embodiment, the bearing unit 50 (thrust needle bearing 60) is interposed between the spring bush 47 and the piston (second piston 44), whereas in the second embodiment, the thrust needle bearing 60 is interposed between the piston (first piston 43) and the diaphragm 11.

According to such a configuration, the thickness of the entire weight measurement device in the vertical direction can be made thinner than that in the first embodiment.

The mounting part 7, the diaphragm 11, the first piston 43, the second piston 44, the spring bush (spring seat) 47, the oil chamber 9, the pressure sensor 21 and the other components are the same as the respective members configuring the first embodiment, and the detailed description thereof will be omitted.

The collar 35 adopted in the second embodiment has the same configuration as the outer collar 35 described in the first embodiment, and therefore, the detailed description thereof is also omitted.

The thrust needle bearing 60 is accommodated in the area where the pad 45 is accommodated in the first embodiment, that is, in the upper groove portion 43h of the first piston 43.

In the figures, a reference numeral 65 indicates a cage. In the second embodiment, rollers 63 formed in a circular in a cross-sectional view larger in diameter than the depth in the vertical direction of the upper groove portion 43h are provided in contact with the lower surface of the thrust plate 90.

The spring bush 47 includes a large-diameter cylindrical portion 47a including a cylindrical through hole 47b capable of mounting the long cylindrical portion 44*a* of the second piston 44, and a flange portion 47*c* integrally extending outwards in the horizontal direction from an upper end of the large-diameter cylindrical portion 47*a*.

The large-diameter cylindrical part 47*a* has opened upper and lower surfaces.

Figure 6:
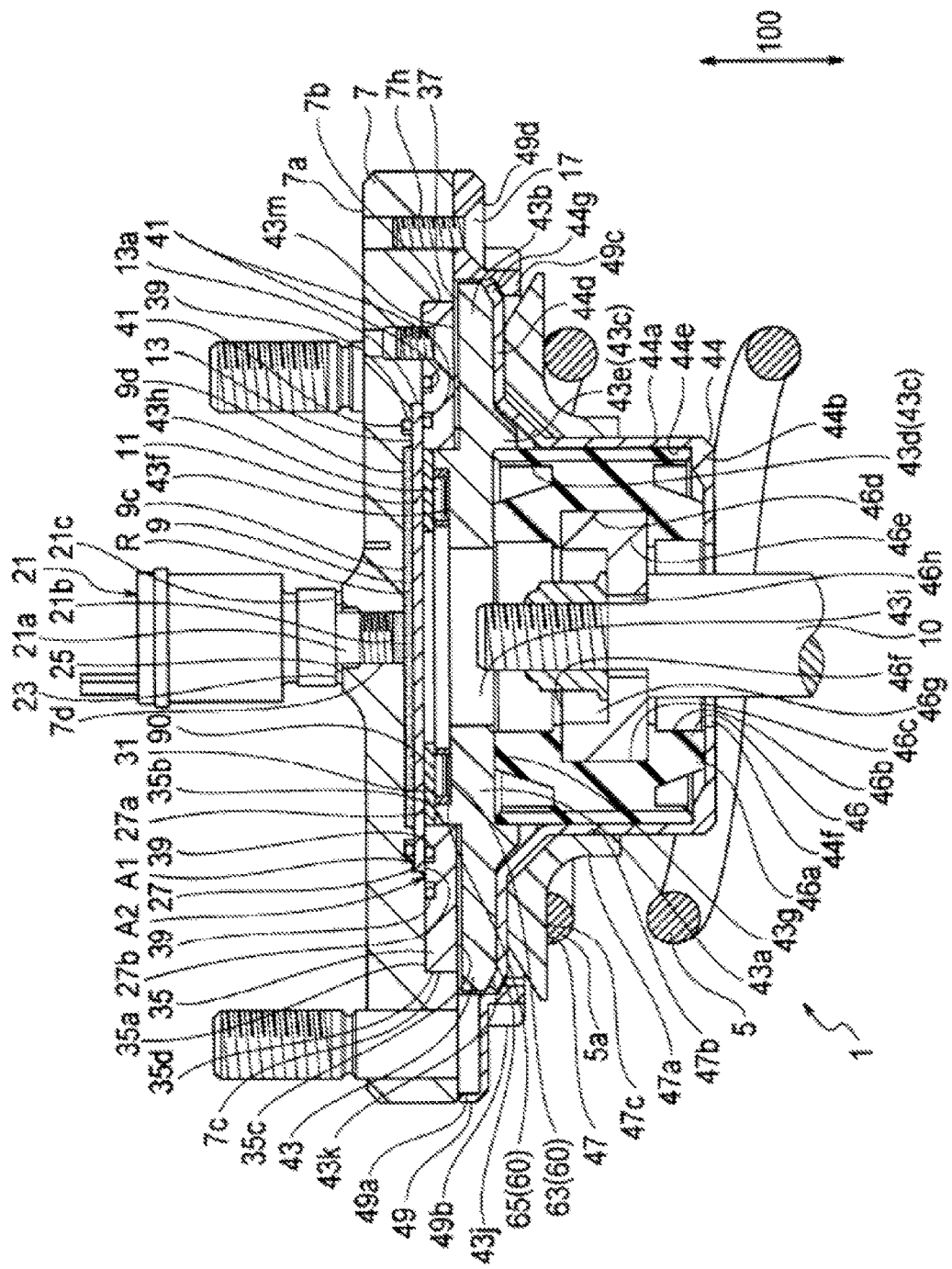
FIG. 6 is a longitudinal sectional view illustrating a vehicle weight measurement device of a second embodiment.
Figure 7:
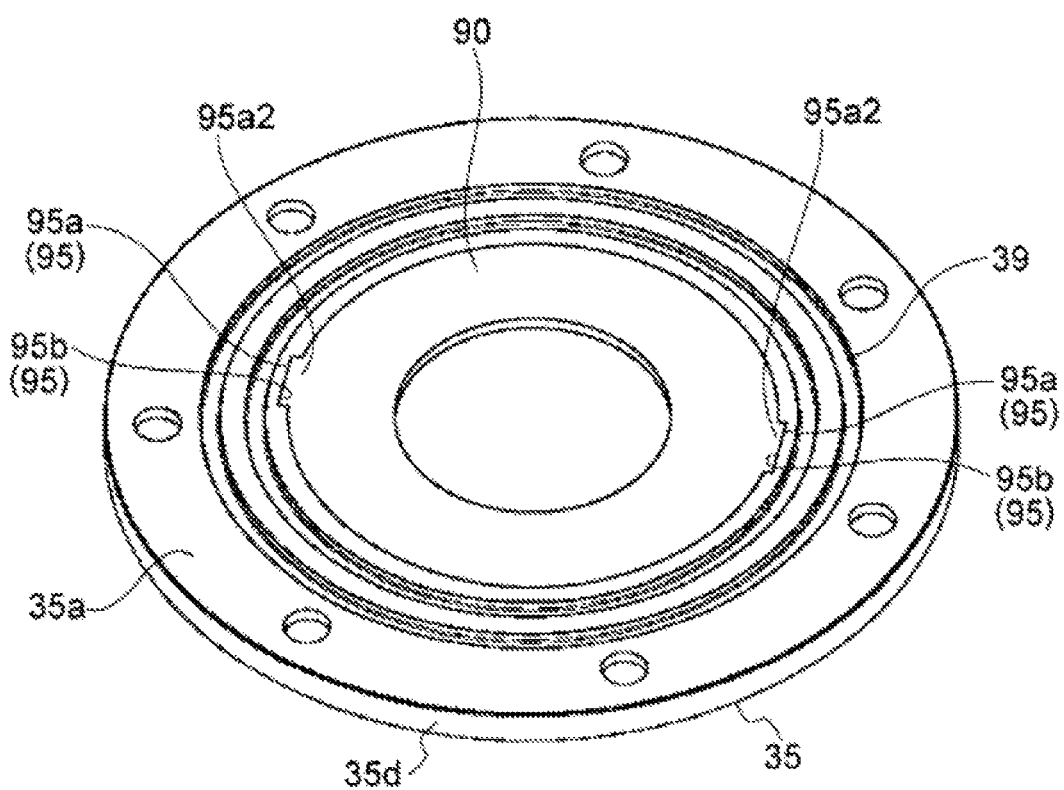
FIG. 7 is a schematic perspective view illustrating a fitted state of a collar and a thrust plate.
Figure 8A:
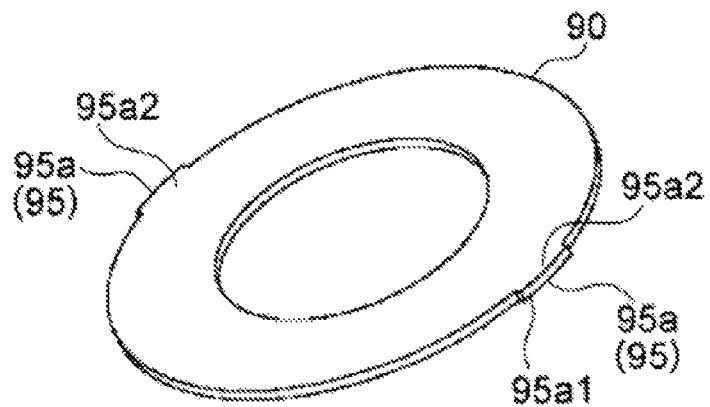
FIG. 8A is a schematic perspective view of the thrust plate.
Figure 8B:
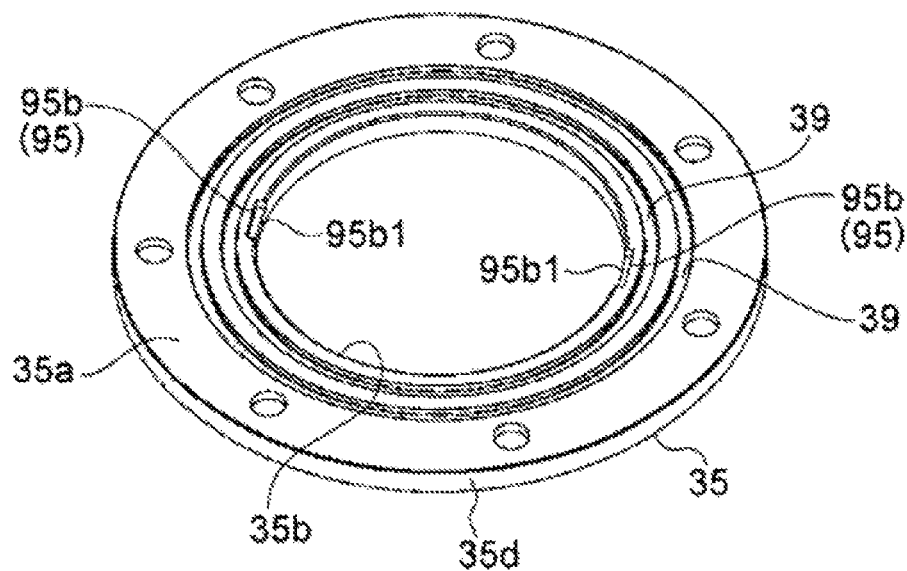
FIG. 8B is a schematic perspective view of the collar.
Figure 8C:
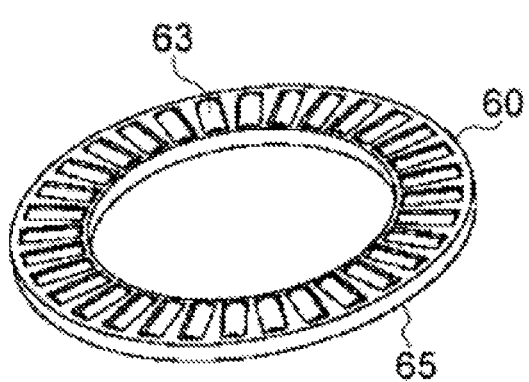
FIG. 8C is a schematic perspective view of a thrust needle bearing.

One end (upper end) 5*a* of the coil spring 5 configuring the suspension device 1 is abutted to a lower surface of the flange part 47*c* in the vertical direction, and the flange portion 44*d* of the second piston 44 is in contact with the upper surface (refer to FIG. 6).

In the second embodiment, the stopper part 49 is formed such that an engaging collar portion 49*c* can be engaged to an engaging portion 44*g* of the second piston 44.

The annular mounting portion 49*a* is formed with bolt insertion holes 49*d* arranged coaxially in the vertical direction with the bolt fixing holes 7*h* of the mounting part 7.

The thrust plate 90 is formed in a disk shape having an outer diameter capable of being engaged to the inner diameter of the collar 35, an inner diameter smaller than the inner diameter of the thrust needle bearing 60, and a thickness accommodated in a space area defined by an upper edge portion of the upper groove portion 43*h* of the first piston 43 and the inner diameter of the collar 35. The thrust plate 90 is interposed between the diaphragm 11 and the first piston 43 via a non-rotating mechanism 95 configured together with the inner diameter of the collar 35.

In the second embodiment, the non-rotating mechanism 95 adopts a concave-convex structure provided in facing areas where the outer diameter of the thrust plate 90 and the inner diameter of the collar 35 face each other.

The concave-convex structure includes a convex portion 95*a* provided on a collar facing surface of the thrust plate 90, and a concave portion 95*b* provided on a thrust plate facing surface of the collar 35. In the second embodiment, a pair of convex portions 95*a*, 95*a* are formed on a line passing through the center of the thrust plate 90 opposite to each other at the outer diameter of the thrust plate 90. Further, a pair of concave portions 95*b*, 95*b* in which the pair of convex portions 95*a*, 95*a* can be fitted are formed on a line passing through the center of the collar 35 opposite to each other in the inner diameter of the collar 35.

The convex portion 95*a* has a thickness the same as that of the thrust plate 90 in the vertical direction and is formed to have a predetermined circumferential length. The concave portion 95*b* is formed such that the convex portion 95*a* can be fitted thereto, and in the second embodiment, the concave portion is formed in a concave shape having a bottom surface 95*b*1 for receiving a lower surface 95*a*1 of the convex portion 95*a*, and the convex portion 95*a* is fitted so as to be accommodated in the concave portion 95*b* without protruding an upper surface 95*a*2.

According to the second embodiment, the thrust plate 90 does not rotate relative to the diaphragm 11, so that the pad 45 adopted in the first embodiment is not necessary.

Contrary to the second embodiment, the concave-convex structure may adopt a structure configured by a concave portion provided on the collar facing surface of the thrust plate, and a convex portion provided on the thrust plate facing surface of the collar, and can be appropriately modified within the scope of the present invention.

Further, the shape and size of the pair of convex portions 95*a*, 95*a* are not particularly limited to the illustrated embodiment, and can be modified within the scope of the present invention.

The number of the convex portion 95*a* and the number of the concave portion 95*b* may be appropriately provided and one or plural. Further, the outer diameter of the thrust plate 90 and the inner diameter of the collar 35 may be formed on continuous concave and convex surfaces which can be fitted with each other.

Third Embodiment

Figure 9:
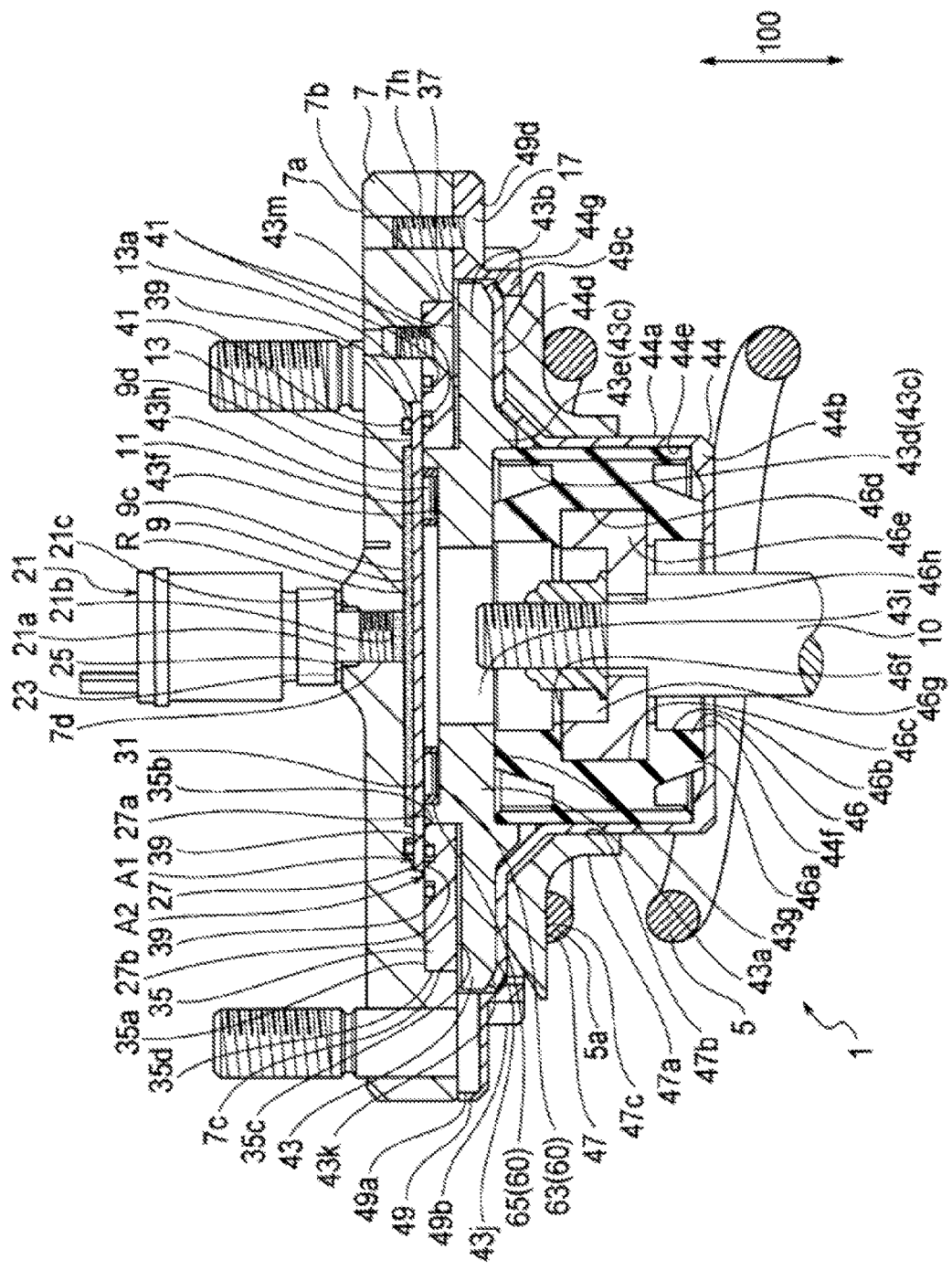
FIG. 9 is a longitudinal sectional view illustrating a vehicle weight measurement device of a third embodiment.

FIG. 9 illustrates a third embodiment of the present invention.

In a vehicle weight measurement device of the third embodiment, the thrust plate 90 adopted in the vehicle weight measurement device of the second embodiment is removed, and the diaphragm 11 is used as a rolling surface of the needle roller 63. Since other configurations and effects are the same as those of the first embodiment and the second embodiment, descriptions of the first embodiment and the second embodiment are incorporated and the detail descriptions thereof are omitted.

According to the third embodiment, the number of parts of the vehicle weight measurement device can be reduced, the cost can be reduced, and the assembly property can be improved. Further, the thickness of the entire weight measurement device in the vertical direction can be further reduced.

For example, in a case where the vehicle weight measurement device of the third embodiment is applied to a light vehicle such as a small automobile or commuter, the material of the diaphragm 11 is not particularly limited, and in a case where the vehicle weight measurement device is applied to a heavy vehicle, the diaphragm 11 is preferably formed of steel having spring property.

INDUSTRIAL APPLICABILITY

The present invention can be applied to suspension devices having the other configurations, in addition to the suspension device having the configurations described in the embodiments.

The present application is based on Japanese Patent Application No. 2016-121056 filed on Jun. 17, 2016, and Japanese Patent Application No. 2017-118514 filed on Jun. 16, 2017, the contents of which are incorporated herein by reference.

DESCRIPTION OF REFERENCE NUMERALS 1 suspension device
7 mounting part
9 oil chamber
9*c* groove portion
9*d* opening area
11 diaphragm
13*a* outer diameter side surface portion of diaphragm
21 pressure sensor
35 outer collar
43 first piston
43*b* flange portion of first piston
44 second piston
44*d* flange portion of second piston
47 spring bush
50 bearing unit
60 thrust needle bearing
75 slide bush
R measurement fluid

The invention claimed is:

1. A vehicle weight measurement device provided to a suspension device and configured to swingably support a vehicle wheel in a steering direction while a bearing is interposed between a member fixed to a vehicle side and a member to be steered, the vehicle weight measurement device comprising:
- a mounting part having an upper surface side fixed to the vehicle side and a lower surface side provided with an opening groove portion having a cylindrical shape;
- a diaphragm having a cylindrical shape and configured to cover an opening area of the groove portion to form an oil chamber of a predetermined space having a cylindrical shape together with the groove portion;
- a collar having a diameter larger than an outer diameter of the opening area of the groove portion and configured to sandwich and tightly fix an outer diameter side surface portion of the diaphragm between the collar and a surface portion outside the opening area of the groove portion;
- a piston configured to press the diaphragm by a resilient force of a spring; and
- a pressure sensor provided to the mounting part and configured to detect a change in pressure of measurement fluid in the oil chamber, which is changeable by movement of the piston,
wherein the bearing is a thrust needle bearing.

2. A vehicle weight measurement device provided to a suspension device and configured to swingably support a vehicle wheel in a steering direction while a bearing is interposed between a member fixed to a vehicle side and a member to be steered, the vehicle weight measurement device comprising:
- a mounting part having an upper surface side fixed to the vehicle side and a lower surface side provided with an opening groove portion;
- a diaphragm configured to cover an opening area of the groove portion to form an oil chamber of a predetermined space together with the groove portion;
- an annular outer collar having a diameter larger than an outer diameter of the opening area of the groove portion and configured to sandwich and tightly fix an outer diameter side surface portion of the diaphragm between the collar and a surface portion outside the opening area of the groove portion;
- a first piston provided to be moveable in a longitudinal direction of the suspension device on an inner diameter side of the collar, including a flange portion arranged on a lower side of the outer collar via a gap with the outer collar, and configured to press the diaphragm by a resilient force of a spring of the suspension device;
- a second piston including a flange portion in contact with a lower surface of the first piston, and a long cylindrical portion with a hollow internal space capable of accommodating a tip end portion of the suspension device inserted therein from a lower side;
- a spring bush configured to receive one end of the spring;
- a bearing unit interposed between the spring bush and the second piston and configured to be relatively rotatable; and
- a pressure sensor provided to the mounting part and configured to detect a change in pressure of measurement fluid in the oil chamber, which is changeable by movement of the pistons,
wherein the bearing unit includes a thrust needle bearing swingably supporting a load in a longitudinal direction of the suspension device, and a slide bush configured not to receive a load in the longitudinal direction and configured to receive a load in a radial direction while causing constant damping to swinging.

3. The vehicle weight measurement device according to claim 2,
wherein the thrust needle bearing includes:
- a pair of annular races arranged on upper and lower sides to face each other and configured to be relatively rotatable;
- a plurality of needle rollers arranged along a bearing internal space formed between the pair of races; and
- a cage configured to rotatably hold the plurality of needle rollers,
wherein the bearing unit includes:
- an upper case arranged in contact with an upper race of the thrust needle bearing; and
- a lower case arranged in contact with a lower race of the thrust needle bearing, and
wherein the lower race is provided with a seal between the lower race and the upper case.

4. The vehicle weight measurement device according to claim 2,
wherein an upper case and a lower case of the bearing unit are provided with a holding mechanism configured to prevent disassembly.

5. The vehicle weight measurement device according to claim 4,
wherein the holding mechanism includes engagement claws provided on the upper case and the lower case and configured to engage with each other.

6. A vehicle weight measurement device provided to a suspension device and configured to swingably support a vehicle wheel in a steering direction while a bearing is interposed between a member fixed to a vehicle side and a member to be steered, the vehicle weight measurement device comprising:
- a mounting part having an upper surface side fixed to the vehicle side and a lower surface side provided with an opening groove portion;
- a diaphragm configured to cover an opening area of the groove portion to form an oil chamber of a predetermined space together with the groove portion;
- a collar having a diameter larger than an outer diameter of the opening area of the groove portion and configured to sandwich and tightly fix an outer diameter side surface portion of the diaphragm between the collar and a surface portion outside the opening area of the groove portion;
- a piston configured to press the diaphragm by a resilient force of a spring; and
- a pressure sensor provided to the mounting part and configured to detect a change in pressure of measurement fluid in the oil chamber, which is changeable by movement of the piston,
wherein the bearing is a thrust needle bearing and is interposed between the diaphragm and the piston.

7. The vehicle weight measurement device according to claim 6,
wherein a thrust plate is interposed between the thrust needle bearing and the diaphragm.

8. The vehicle weight measurement device according to claim 7,
wherein a non-rotating mechanism is provided in a facing area between the thrust plate side and the collar side.

* * * * *